United States Patent [19]

Niiro

[11] 4,028,644
[45] June 7, 1977

[54] SYSTEM EQUALIZATION FOR REPEATERED SUBMARINE CABLE SYSTEM

[75] Inventor: Yasuhiko Niiro, Tokyo, Japan

[73] Assignee: Kokusai Denshin Denwa Kabushiki Kaisha, Japan

[22] Filed: Dec. 9, 1975

[21] Appl. No.: 639,107

[30] Foreign Application Priority Data

Dec. 16, 1974   Japan .............................. 49-144287

[52] U.S. Cl. ............................... 333/16; 178/63 E; 333/18; 333/28 R
[51] Int. Cl.² ...................... H03H 7/16; H04B 3/10
[58] Field of Search .............. 178/63 E; 333/16, 18, 333/28 R

[56] References Cited

UNITED STATES PATENTS

| | | | |
|---|---|---|---|
| 2,719,270 | 9/1955 | Ketchledge | 333/18 X |
| 3,106,679 | 10/1963 | Friedrich | 333/16 X |
| 3,177,429 | 4/1965 | Markl | 333/16 X |
| 3,414,688 | 12/1968 | Hermes et al. | 333/16 UX |
| 3,812,436 | 5/1974 | Fudemoto et al. | 333/18 |

*Primary Examiner*—Paul L. Gensler
*Attorney, Agent, or Firm*—Robert E. Burns; Emmanuel J. Lobato; Bruce L. Adams

[57] ABSTRACT

A system equalizer and a method of equalization employed in a repeatered submarine cable system, in which automatic gain controlled (AGC) submerged repeaters are employed to compensate for fluctuations of the cable loss caused by the temperature fluctuations in the surrounding environment of the repeatered submarine cable system. In a terminal equipment connected to the repeatered submarine cable system, the seasonal misalignment of the repeatered cable system is equalized by a switchable equalizer having a loss-frequency characteristic corresponding to the total of compensation errors in the AGC submerged repeaters. Short-term level fluctuations of the repeatered cable system are compensated by an automatic equalizer, which has a loss-frequency characteristic proportional to the square root of frequency $f$ and is controlled by the level of a pilot signal transmitted through the repeatered submarine cable system. An unknown fixed deviation is finally equalized by a second adjustable equalizer.

6 Claims, 3 Drawing Figures

SYSTEM EQUALIZATION FOR REPEATERED SUBMARINE CABLE SYSTEM

This invention relates to system equalization for a repeatered submarine cable system.

In a submarine cable system, submarine repeaters for compensating the cable loss are inserted at regular intervals, so that signal transmission with negligible attenuation of the signal level is achieved between two places across the sea. In this case, the gain characteristic of each repeater is designed to coincide with the loss characteristic of the cable but, in practice, a slight compensation error remains. When the total of these errors is large, the system S/N performance is deteriorated. Accordingly, ocean block equalizers are inserted in the cable system at regular intervals to compensate for the compensation errors so that the total of the compensation errors is in such a range as not to exert an influence upon the system S/N performance. Further, in a submarine cable landing station, terminal equipment is provided for connecting the submarine cable system to other land transmission lines. In each terminal equipment, in order to make the overall remaining compensation error (hereinafter referred to as the misalignment) of the submarine cable system flat, and in order to prevent deterioration of the signal to noise ratio in the submarine cable system, a sending system equalizer and a receiving system equalizer are respectively provided in the transmitting side and the receiving side of the submarine cable landing station.

By the way, in a case where the cable route of the submarine cable system includes many shallow seas sections, an average temperature in the shallow sea is higher than that in the deep sea and the temperature fluctuation range is relatively great, so that the level deviation range of the entire system is increased. The loss $\alpha$ of the submarine coaxial cable is substantially expressed by $\alpha = A\sqrt{f}$ dB under a constant temperature condition, where $A$ is a constant and $f$ is a frequency. The temperature coefficient in a frequency band below several MHz is about 0.18% /°C and the deviation $\alpha_t$ of the loss in the submarine cable with temperature is $\alpha_t = 0.0018 \cdot A \sqrt{f}$ dB/°C. The repeater gain is generally about 40dB at the highest transmitted frequency, and the cable loss per one repeater section is 40dB at the highest frequency, while the deviation of the loss due to the temperature change of one repeater section is $\alpha_t = 0.0018 \times 40 \approx 0.7$dB/° C. Assuming that the system is composed of 100 repeater sections and that the temperature deviation in one year is a range of ±5° C, the level deviation of the entire system due to the temperature fluctuations is equal to 0.07db/°C × ±5° C × 100 = ±35dB.

The characteristic of the repeater designed for low cost has a margin for the level deviation of only several dB at most, due to limitations on the circuit construction of the repeater. Further, in a case where level adjustment is performed at the terminal equipment under the constant condition of the signal to noise ratio, that is, a noise characteristic, if the adjustment is achieved at the sending and receiving terminal equipments, the margin for the level deviation is doubled but can respond to only level deviation of some dozen dB or so. Accordingly, in order to obtain a repeater which can respond to such a great level fluctuation as mentioned above, it is necessary to greatly increase the margin of the repeater for the level deviation and this shortens a unit repeater section length to make the system very uneconomical.

An object of this invention is to provide a system equalizer which ensures equalization with very simple means at the terminal equipment of a submarine cable system.

Another object of this invention is to provide a method for equalizing the loss-frequency characteristic of a repeatered submarine cable system by the use of the above equalizer.

The principle, construction and operation of this invention will be clearly understood from the following detailed description taken in conjunction with the accompanying drawings, in which.

Figure 1:
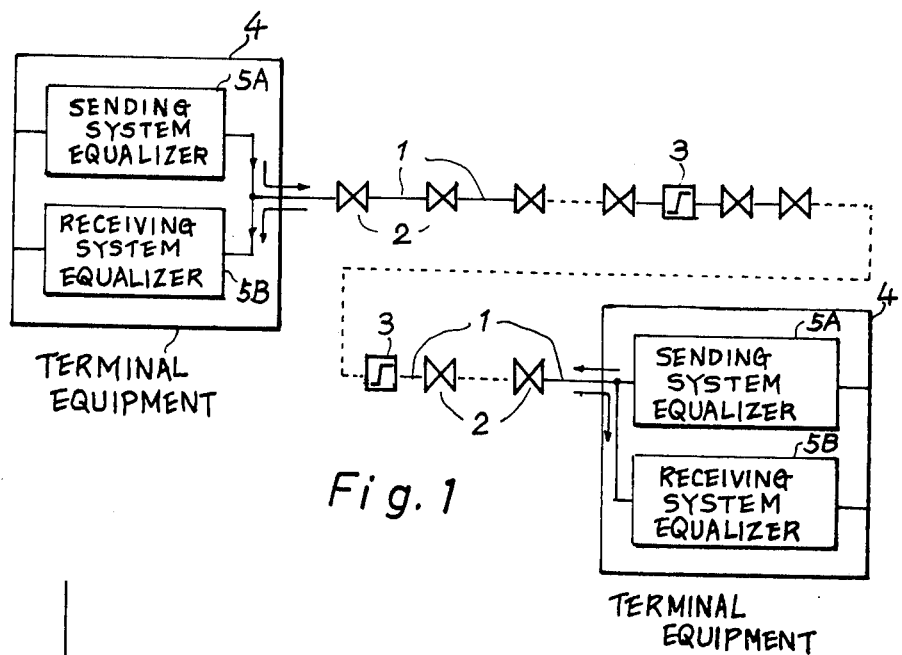
FIG. 1 is a block diagrm illustrating a repeatered submarine cable system to which this invention is applied.

In a repeatered submarine cable system to which this invention is applied, submarine repeaters 2 are inserted at regular intervals in a submarine cable 1 as shown in FIG. 1 to compensate for the cable loss. Submarine equalizers 3 are also inserted in the cable system at regular intervals to compensate for compensation errors in a predetermined number of repeater sections. In each of terminal equipments 4, there are provided a receiving system equalizer 5B and a sending system equalizer 5A.

The present invention employs, in at least one part of the submarine cable system, T-AGC (Temperature-Automatic Gain Control) repeaters in each of which the gain-temperature characteristic of a repeater such as used in a land cable system is controlled in the same manner as the loss-temperature characteristic of the cable to compensate using the repeater, for the level deviation due to the temperature fluctuations of the cable. In this case, the gain-temperature characteristic of the T-AGC repeater is designed so as to coincide with the loss-temperature characteristic of the cable. In practice, however, the cable loss cannot be completely compensated by the repeater so that a deviation referred to as a T-AGC deviation $\Delta M(f)_{T\text{-}AGC}$ is still present. The T-AGC deviation is produced at different frequencies in respective repeater sections and, if the system is composed of N's repeater sections, the overall deviation of T-AGC is equal to $$\sum_{n=1}^{N} \Delta M(f)_{T\text{-}AGC}(n).$$

This deviation becomes level deviations corresponding to seasonal temperature fluctuations at the sea bottom. The time constant of the loss-temperature characteristic of the submarine coaxial cable is approximately ten minutes and the time constant of the gain-temperature characteristic of the T-AGC repeater ranges from three to four hours. Thus, their response speeds to the temperature fluctuations are different from one another, so that when the temperature at the sea bottom undergoes such a short time change as about several hours, the T-AGC repeater connot completely follow the temperature change because of its large time constant while the cable almost completely follows the temperature change since its time constant is small. This results in a level change in the loss-frequency characteristic (approximately defined by the square root of frequency $f$) of the cable with respect to temperature.

As described above, the characteristic $M(f)$ of the overall misalignment of the repeatered submarine cable system including shallow sea sections with respect to the frequency $f$ is classified into the total $M_f(f)$ of misalignment deviations of respective repeater sections at a reference temperature for system design, the total $M_S(f)$ of the T-AGC deviations of the respective repeater sections based on corresponding differences between the design reference temperatures and working temperatures, and a short-term level deviation $M_D(f)$ approximately appearing in the form of $\sqrt{f}$. Thus, $M(f)=M_F(f)+M_S(f)+M_D(f)$. An example of each characteristic is shown in FIG. 2.

Figure 2:
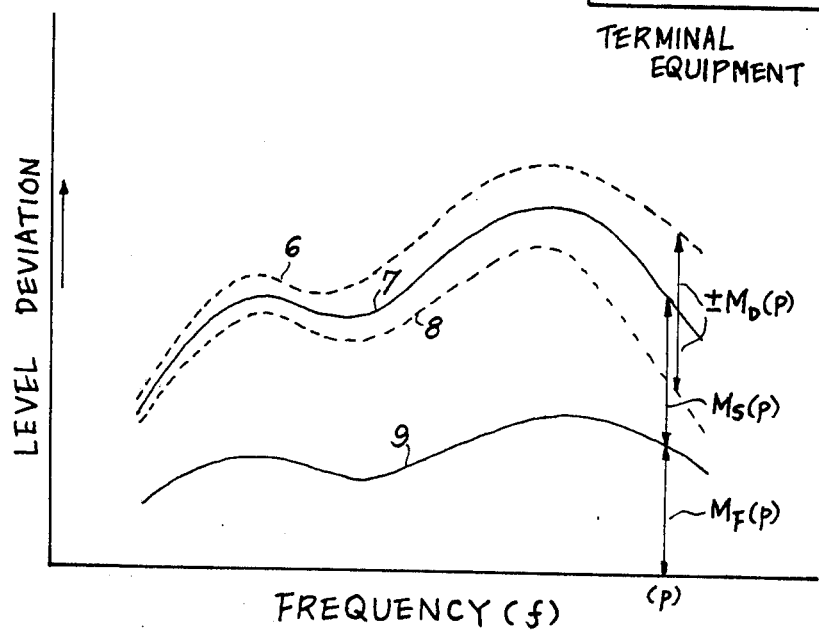
FIG. 2 shows examples of misalignment characteristics of the repeatered submarine cable system.

Within a short time after laying a submarine cable, the overall misalignment of the cable system will be measured in the range defined between curves 6 and 8 in FIG. 2. This value frequently fluctuates and, as the results of measurements for several ten hours, maximum and minimum values (the curves 6 and 8) of these short-term level fluctuations are obtained. However, if the measurement time is further prolonged, an influence of the misalignment based on the seasonal deviations $M_S(f)$ appears and makes it difficult to clearly distinguish the short-term level fluctuations and the seasonal level deviation from each other as shown in FIG. 2. The curve 7 shows the average value of the short-term level fluctuations, in which the seasonal level deviation $M_S(f)$ and a fixed misalignment $M_F(f)$ are included.

Figure 3:
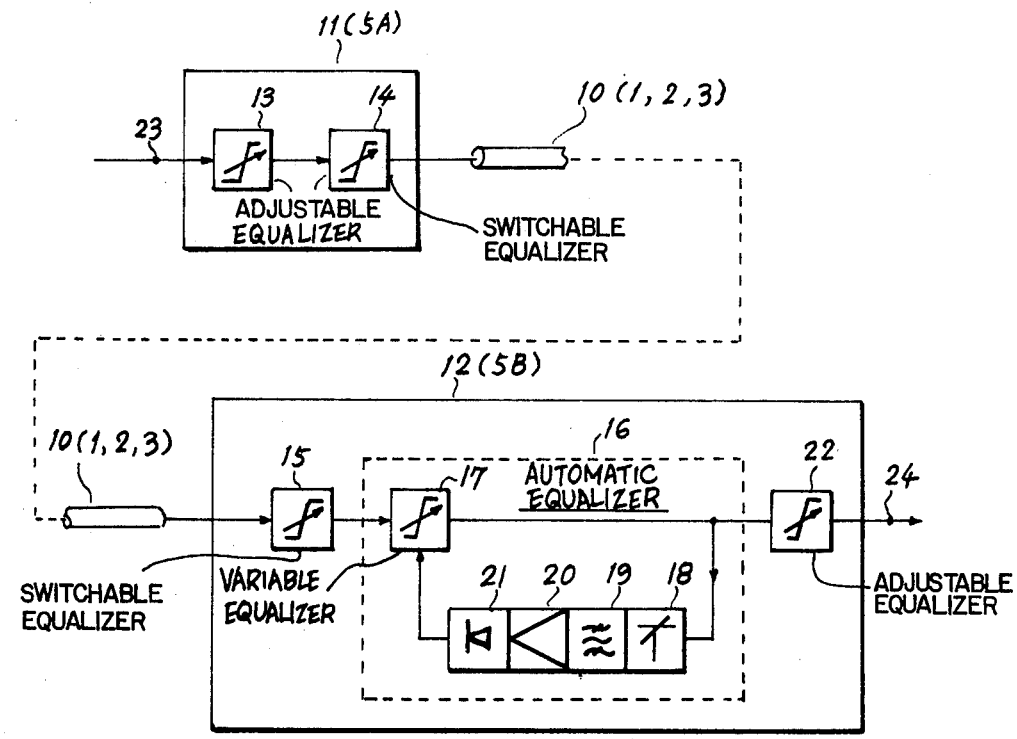
FIG. 3 is a block diagram illustrating an embodiment of a system equalizer of this invention.

FIG. 3 illustrates an example of the construction of a system equalizer of this invention. A sending system equalizer $11(5_A)$ and a receiving system equalizer $12(5_B)$ are interconnected through a repeatered submarine cable system 10 including the cable 1, the repeaters 2 and the equalizers 3. Immediately after laying the repeatered submarine cable system, these sending and receiving system equalizers 11, 12 have flat frequency characteristics and are replaced by fixed attenuators corresponding to constant losses of the system equalizers. If the misalignment of the entire system is measured at a sending end 23 and a receiving end 24, data which indicate instantaneous fluctuations between the broken curves 6 and 8 in FIG. 2 due to the short-term level fluctuations of the cable system are obtained. By continuously recording the level of a pilot signal P allocated in the higher-frequency band of the transmission band, the average value of the short-term level fluctuation (corresponding to $M_S(P)+M_F(F)$ in FIG. 2) is obtained. Further, frequencies of tone signals from repeater-supervisory tone oscillators which are incorporated in respective repeaters and whose frequencies vary in proportion to the ambient temperatures of the respective repeaters, are measured, from which the temperatures of the respective repeaters are calculated. These are the operating temperatures $t$ of the corresponding repeaters and can be regarded as the operating temperatures of corresponding repeater sections. The total of T-AGC deviations of N repeater sections based on differences between the design temperatures $t_0$ and the operating temperatures $t$ of the respective repeater sections becomes the seasonal level deviation $M_S(f)_N$, that is, $$M_S(f) = \sum_{n=1}^{N} [\Delta M(f)_{T\text{-}AGC}(t)]_n - \sum_{n=1}^{N} [\Delta M(f)_{T\text{-}AGC}(t_0)]_n$$

This can be obtained by calculation before laying the cable system for each set of forecasted seasonal values of temperatures so that the equalization characteristics of equalizers 14 and 15 can be determined at the sea bottom so as to be switchable to suit an optimum one of the above forecast seasonal values. Accordingly, these equalizers 14 and 15 are switching or strapping switchaable equalizers, which are disposed on the sending and receiving sides, respectively, and are pre-equalizable for preventing deterioration of the system S/N performance. For example, one half of $M_S(f)$ is equalized by the equalizer 14 and the remaining one half is equalized by the equalizer 15.

An automatic equalizer 16 for equalization of the short-term level fluctuation is provided with a detecting circuit for detecting a pilot level. The pilot level detecting circuit is composed of a variable attenuator 18, a pilot extracting filter 19, an amplifier 20 and a rectifier 21. An automatic control operation is achieved by the DC output from the pilot detecting circuit so that the output of a variable equalizer 17 becomes constant. The frequency characteristic of the short-term fluctuations is in the form of $\sqrt{f}$ and the variable equalizer 17 is a network having a function of $\sqrt{f}$. The seasonal level deviation $M_S(P)$ is subtracted from the misalignment $(M_S(P)+M_F(P))$ at the pilot frequency, indicated by the aforesaid curve 7 in FIG. 2, to obtain the fixed misalignment $M_F(P)$. If the automatic equalizer 16 is controlled under this condition, the pilot signal level is offset by the value of $M_F(P)$. In this case, the variable attenuator 18, which is disposed at the input of the pilot detector circuit of the automatic equalizer 16, is adjusted to increase or decrease the attenuation of the variable attenuator 18 depending upon whether $M_F(P)$ is plus or minus respectively. In this manner, each repeater is so constructed that an offset of $M_F(P)$ of the pilot reference level at the input of the aromatic equalizer is avoidable and that the automatic equalizer 16 is not erroneously controlled in response to the fixed component of the misalignment. Thus, after the seasonal switchable equalizers 14 and 15 and the automatic equalizer 16 are effectively adjusted for an optimum set of the above-mentioned forcasted seasonal values of the temperatures at the sea bottom, only the fixed component of the misalignment (the cuve 9 in FIG. 2) is obtained at the output of the automatic equalizer 16 without complicated calculations in laying the cable.

For changing the pilot reference level at the input of the automatic equalizer 16, it is also possible to change the gain of the amplifier 20 without use of the variable attenuator 18, or to change a reference voltage established at the output side of the rectifier 21.

In order to maintain the system S/N performance in its optimum state, one half the fixed component $M_F(P)$ of the misalignment is equalized by an adjustable equalizer 13 in the sending system equalizer 11, while the remaining one half is equalized by an adjustable equalizer 22 in the receiving system equalizer 12.

In the example of the system equalizer of this invention shown in FIG. 3, if the level deviation due to the seasonal deviation is small in amount and does not so much contribute to deterioration of the system S/N performance, it is also possible to omit the switchable equalizer 14 of the sending system equalizer and to effect equalization only with the switchable equalizer 15 of the receiving system equalizer 12. The adjustable equalizers 13 and 22 are provided for the equalization of unknown fixed misalignment and, in the case of a short submarine cable system without any ocean block equalizer in the cable system, it is also possible to omit the adjustable equalizer 13 at the sending side and to use only the adjustable equalizer 22. However, if the order of the switchable equalizer 15 and the automatic equalizer 16 with respect to the transmission direction is exchanged, it is necessary to increase an allowable level range of the automatic equalizer 16 and, further, there is a defect in that an equalization error by the switchable equalizer 15 cannot be compensated for by the automatic equalizer 16. If the order of the automatic equalizer 16 and the variable equalizer 22 is exchanged, the reference level at the input of the automatic equalizer 16 is varied by the adjustment of the adjustable equalizer 22 so that it is necessary to dispose the automatic equalizer 16 at a stage preceding the adjustable equalizer 22.

The system equalization of this invention described above in detail requires only (1) continuous recording of the pilot level for calculation of a central value of the short-term level fluctuation, (2) measurement of the frequencies of the repeater-supervisory tones for calculation of the operation temperatures of a corresponding repeater section and (3) one simple measurement of the amount of transmission for finally measuring the unknown fixed misalignment. Accordingly, factors for calculation errors and necessary data are small in number, so that processing is simple and system equalization can be achieved in a very short time without fail. Further, in accordance with the present equalization, it is possible to minimize the increase of noise level resulting from misalignment and, in addition, since equalization errors by the various equalizers making up the system equalizer are ultimately equalized by the adjustable equalizer 22, no equalization error results from calculation errors so that high precision equalization is possible. Moreover, since the short-term level fluctuations are always equalized by the automatic equalizer 16, a decrease in the number of equalizer adjustments for system maintenance can be expected. Further, by monitoring the pilot level disposed at the lower position of the transmission frequency band, the short-term level fluctuatioons are always equalized, the value $\sqrt{f}$ does not vary so much at the lower position of the frequency band and only the seasonal deviation appears. Therefore, in each terminal equipment 4 it is also possible to achieve such simple and reliable maintenance, in which if the pilot level becomes lower than a predetermined value, only an equalizer 14 (15) for seasonal deviation is switched.

What I claim is:

1. A system equalizer, for use in a repeatered submarine cable system including automatic gain controlled submerged of a temperature following type, comprising:

a switchable equalizer connected to a repeatered submarine cable system including automatic gain controlled submerged repeaters of a temperature following type and switchable to select an optimum one of a plurality of loss-frequency characteristics corresponding to the total of compensation errors in said automatic gain controlled submerged repeaters to compensate for a seasonal misalignment of the repeatered cable system;

an automatic equalizer, including pilot signal detecting means for detecting a pilot signal transmitted through the repeatered cable system and for developing a control signal representative of the detected pilot signal, and connected to said switchable equalizer and having a loss-frequency characteristic proportional to the square root of frequency to compensate for short-term level fluctuations of the repeatered cable system under control of the control signal developed by said pilot signal detecting means; and an adjustable equalizer connected to said automatic equalizer to compensate for an unknown fixed deviation developed at an output of said automatic equalizer.

2. A system equalizer according to claim 1, in which said automatic equalizer includes a controlled equalizer connected between said switchable equalizer and said adjustable equalizer, and said pilot signal detection means is connected to said controlled equalizer for controlling the controlled equalizer in accordance with the level of a pilot signal transmitted through said repeatered submarine cable system, said switchable equalizer and said controlled equalizer.

3. A system equalizer according to claim 2, in which said detection means comprises a cascade connection of a variable attenuator, a band-pass filter for the pilot signal, and amplifier, and a detector for detecting the amplified pilot signal.

4. A system equalizer according to claim 1 further including, at a sending side of the repeatered submarine cable system, a second switchable equalizer switchable to select an optimum one of a plurality of loss-frequency characteristics to compensate for a part of the seasonable misalignment of said repeatered cable system.

5. A system equalizer according to claim 4, further including, at a stage preceding said second switchable equalizer, a second adjustable equalizer to compensate for a part of the unknown fixed deviation.

6. A method for equalizing the loss-frequency characteristic of a repeatered submarine cable system including automatic gain controlled submerged repeaters of a temperature follow type, and a switchable equalizer comprising:

measuring frequencies of repeater-supervisory tone signals from oscillators of the repeaters for detecting the operation temperatures of corresponding repeater sections;

switching the switchable equalizer connected to said repeatered submarine cable system and to select an optimum one of a plurality of loss-frequency characteristics corresponding to the total of compensation errors in the automatic gain controlled submerged repeaters in consideration of the above detected operation temperatures to compensate for the seasonal misalignment of said repeatered cable system;

connecting to the output of said switchable equalizer an automatic equalizer having a loss-frequency characteristic proportional to the square root of frequency to compensate for short-term level fluctuations of the repeatered cable system and which includes detection means for detecting a pilot signal transmitted through said repeatered submarine cabel system to control the compensation of the short-term level fluctuations;

adjusting the level of said pilot signal at the input of said detection means to compensate for a total of misalignment deviations of the respective repeater sections; and connecting an adjustable equalizer to the output of said automatic equalizer to compensate for an unknown fixed deviation at the output of said automatic equalizer.

* * * * *